US008244093B2

(12) United States Patent
Naganuma et al.

(10) Patent No.: US 8,244,093 B2
(45) Date of Patent: Aug. 14, 2012

(54) VIDEO SIGNAL PROCESSING DEVICE AND METHOD, AND PROGRAM

(75) Inventors: Hiromasa Naganuma, Chiba (JP); Hiroshi Kobayashi, Kanagawa (JP); Takuma Morita, Kanagawa (JP)

(73) Assignee: Sony Corporation, Tokyo (JP)

( * ) Notice: Subject to any disclaimer, the term of this patent is extended or adjusted under 35 U.S.C. 154(b) by 1631 days.

(21) Appl. No.: 11/411,879

(22) Filed: Apr. 27, 2006

(65) Prior Publication Data

US 2006/0274203 A1    Dec. 7, 2006

(30) Foreign Application Priority Data

May 11, 2005    (JP) .................................. 2005-138099

(51) Int. Cl.
*H04N 5/932* (2006.01)
(52) U.S. Cl. .......................... 386/219; 386/218; 386/230
(58) Field of Classification Search .................. 386/125, 386/126, 218, 219, 230; 348/186
See application file for complete search history.

(56) References Cited

U.S. PATENT DOCUMENTS

| | | | | | |
|---|---|---|---|---|---|
| 6,128,316 | A | * | 10/2000 | Takeda et al. ................. | 370/468 |
| 6,804,455 | B1 | * | 10/2004 | Yoo et al. ....................... | 386/230 |
| 7,646,528 | B2 | * | 1/2010 | Maeda et al. ................. | 359/290 |
| 7,679,612 | B2 | * | 3/2010 | Milirud et al. ................ | 345/204 |
| 2005/0157172 | A1 | * | 7/2005 | Hartley et al. ................ | 348/186 |
| 2005/0246329 | A1 | * | 11/2005 | Milirud et al. ..................... | 707/3 |
| 2007/0009232 | A1 | * | 1/2007 | Muraki et al. ................... | 386/95 |

FOREIGN PATENT DOCUMENTS

| | | |
|---|---|---|
| JP | 2001-356752 | 12/2001 |
| JP | 2005-51547 | 2/2005 |
| JP | 2005-80030 | 3/2005 |
| WO | WO 2004/091198 A1 | 10/2004 |

* cited by examiner

*Primary Examiner* — Jamie Atala
(74) *Attorney, Agent, or Firm* — Oblon, Spivak, McClelland, Maier & Neustadt, L.L.P.

(57) ABSTRACT

A video signal processing device including a specification information obtaining unit for obtaining specification information indicating specifications of a monitor connected to a digital video output terminal, a selecting operation receiving-unit for receiving a user selecting operation for selecting a type of analog video output terminal for a monitor connected to the analog video output terminal, a setting operation receiving unit for receiving a user setting operation for prioritizing one of the specification information obtained by the specification information obtaining unit and the user selecting operation received by the selecting operation receiving unit, and a determining unit for determining a resolution of a video signal to be output on a basis of the specification information obtained by the specification information obtaining unit, the user selecting operation received by the selecting operation receiving unit, and the user setting operation received by the setting operation receiving unit.

6 Claims, 5 Drawing Sheets

HDMI AND COMPONENT OUTPUT SETTING TABLE
[HDMI PRIORITY SETTING HDMI 480i (720×480i) 4:3 OUTPUT]

| OUTPUT PICTURE FORMAT | D TERMINAL RESOLUTION SELECTING BUTTON D1 | | | | | |
|---|---|---|---|---|---|---|
| | HDMI OUTPUT | | COMPONENT OUTPUT | | | |
| | HDIF | | CMPN | TV-SIDE DISPLAY (SUPPORTING VBID) | | |
| | OUTPUT PICTURE | MUTE | OUTPUT PICTURE | 16:9 FORM | 4:3 FORM | |
|  |  | × |  |  NORMAL |  NORMAL | |
|  |  | × |  |  NORMAL |  NORMAL | |

FIG. 4B

| OUTPUT PICTURE FORMAT | D TERMINAL RESOLUTION SELECTING BUTTON D2 | | | | | |
|---|---|---|---|---|---|---|
| | HDMI OUTPUT | | COMPONENT OUTPUT | | | |
| | HDIF | | CMPN | TV-SIDE DISPLAY (SUPPORTING VBID) | | |
| | OUTPUT PICTURE | MUTE | OUTPUT PICTURE | 16:9 FORM | 4:3 FORM | |
|  |  | × |  |  NORMAL |  NORMAL | |
|  |  | × |  |  NORMAL |  NORMAL | |

VIDEO SIGNAL PROCESSING DEVICE AND METHOD, AND PROGRAM

CROSS REFERENCES TO RELATED APPLICATIONS

The present invention contains subject matter related to Japanese Patent Application JP2005-138099 filed with the Japanese Patent Office on May 11, 2005, the entire contents of which being incorporated herein by reference.

BACKGROUND OF THE INVENTION

The present invention relates to a device and a method for video signal processing, and a program, and particularly to a device and a method for video signal processing, and a program that set a common resolution for video signals to be output when a monitor is connected to each of a digital video output terminal and an analog video output terminal.

A set-top box receiving television broadcasts, a DVD player for reproducing contents recorded on a DVD (Digital Versatile Disc), a DVD recorder and an HDD (Hard Disc Drive) recorder for recording and reproducing television programs, and the like (these devices will hereinafter be referred to as video output devices) have a composite video terminal, an S (separate) video terminal, a component video terminal, a D video terminal and the like as terminals for outputting video signals. Each of these terminals outputs a video signal as an analog signal, and will therefore be referred to hereinafter as an analog video output terminal.

On the other hand, there are video output devices having an HDMI (High Definition Multimedia Interface) terminal for outputting a video signal as a digital signal unlike the above-described analog video output terminals. The HDMI terminal has for example advantages of being able to output an audio signal in addition to a video signal while the analog video output terminal outputs only a video signal, of reducing degradation in picture quality because when a video signal to be output is originally a digital signal, the video signal can be output without being converted into an analog signal, and of being able to obtain specification information (resolution, aspect ratio and the like of a monitor) of a device (for example a television receiver) to which the HDMI terminal is connected. Incidentally, details of the HDMI terminal are described in Non-Patent Document 1 (EIA/CEA-861B DRAFT 020328), for example.

There are existing video output devices that have both an analog video output terminal and an HDMI terminal each of which can be connected to a monitor (a television receiver or the like). When a monitor is connected to each of the analog video output terminal and the HDMI terminal of such a video output device, it is desirable that video signals conforming to the specifications of the monitors to which the respective output terminals are connected be output from the respective output terminals.

However, when the specifications of the monitor connected to the analog video output terminal are different from the specifications of the monitor connected to the HDMI terminal, performing twice a process of converting the resolution or the like of a video signal to be output so as to correspond to the specifications of both the monitors represents a heavy load on the video output device. Therefore the process of converting the resolution or the like is performed only once so as to correspond to the specifications of one of the two monitors or common specifications. A problem in this case is which specifications to adjust the converting process to.

SUMMARY OF THE INVENTION

The present invention makes it possible to determine specifications when video signals are output with common specifications from both an analog video output terminal and an HDMI terminal.

According to an embodiment of the present invention, there is provided a video signal processing device including: a specification information obtaining unit for obtaining specification information indicating specifications of a monitor connected to a digital video output terminal; a selecting operation receiving unit for receiving a user selecting operation for selecting a type of analog video output terminal for a monitor connected to the analog video output terminal; a setting operation receiving unit for receiving a user setting operation for prioritizing one of the specification information obtained by the specification information obtaining unit and the user selecting operation received by the selecting operation receiving unit; and a determining unit for determining a resolution of a video signal to be output on a basis of the specification information obtained by the specification information obtaining unit, the user selecting operation received by the selecting operation receiving unit, and the user setting operation received by the setting operation receiving unit.

The determining unit can determine the resolution of the video signal to be output by applying a correspondence table corresponding to the specification information obtained by the specification information obtaining unit, the user selecting operation received by the selecting operation receiving unit, and the user setting operation received by the setting operation receiving unit among correspondence tables prepared in advance.

A video signal processing device according to an embodiment of the present invention can further include a receiving unit for receiving a television broadcast signal as the video signal to be output.

A video signal processing device according to an embodiment of the present invention can further include a recording and reproducing unit for recording the television broadcast signal received by the receiving unit onto a recording medium and reproducing the television broadcast signal.

According to an embodiment of the present invention, there is provided a video signal processing method including: a specification information obtaining step of obtaining specification information indicating specifications of a monitor connected to a digital video output terminal; a selecting operation receiving step of receiving a user selecting operation for selecting a type of analog video output terminal for a monitor connected to the analog video output terminal; a setting operation receiving step of receiving a user setting operation for prioritizing one of the specification information obtained by a process of the specification information obtaining step and the user selecting operation received by a process of the selecting operation receiving step; and a determining step of determining a resolution of a video signal to be output on a basis of the specification information obtained by the process of the specification information obtaining step, the user selecting operation received by the process of the selecting operation receiving step, and the user setting operation received by a process of the setting operation receiving step.

According to an embodiment of the present invention, there is provided a program for making a computer perform a process including: a specification information obtaining step of obtaining specification information indicating specifications of a monitor connected to a digital video output terminal; a selecting operation receiving step of receiving a user selecting operation for selecting a type of analog video output terminal for a monitor connected to the analog video output terminal; a setting operation receiving step of receiving a user setting operation for prioritizing one of the specification information obtained by a process of the specification information obtaining step and the user selecting operation received by a process of the selecting operation receiving step; and a determining step of determining a resolution of a video signal to be output on a basis of the specification information obtained by the process of the specification information obtaining step, the user selecting operation received by the process of the selecting operation receiving step, and the user setting operation received by a process of the setting operation receiving step.

In the present invention, specification information indicating specifications of a monitor connected to a digital video output terminal is obtained, a user selecting operation for selecting a type of analog video output terminal for a monitor connected to the analog video output terminal is received, and a user setting operation for prioritizing one of the obtained specification information and the received user selecting operation is received. Then, a resolution of a video signal to be output is determined on a basis of the obtained specification information, the received user selecting operation, and the received user setting operation.

According to the present invention, it is possible to determine specifications when video signals are output with common specifications from both an analog video output terminal and an HDMI terminal.

DETAILED DESCRIPTION OF THE PREFERRED EMBODIMENTS

Preferred embodiments of the present invention will hereinafter be described. Correspondences between required elements described in claims and concrete examples in the embodiments of the invention are illustrated as follows. This description is to confirm that the concrete examples supporting inventions described in the claims are described in the embodiments of the invention. Therefore, even when there is a concrete example described in the embodiments of the invention but not described here as corresponding to a required element, it does not signify that the concrete example does not correspond to the required element. Conversely, even when a concrete example is described here as corresponding to a required element, it does not signify that the concrete example does not correspond to required elements other than that required element.

Further, this description does not signify that inventions corresponding to the concrete examples described in the embodiments of the invention are all described in the claims. In other words, this description does not negate presence of inventions corresponding to concrete examples described in the embodiments of the invention but not described in the claims of the present application, that is, presence of inventions to be presented in a divisional application or to be added by amendments in the future.

A video signal processing device (for example a recording and reproducing device 1 in FIG. 1) according to an embodiment of the present invention includes: a specification information obtaining unit (for example a monitor information obtaining unit 20 in FIG. 1) for obtaining specification information indicating specifications of a monitor connected to a digital video output terminal (for example an HDMI I/F 19 in FIG. 1); a selecting operation receiving unit (for example a D1/2/3/4 selecting button 23 in FIG. 1) for receiving a user selecting operation for selecting a type of analog video output terminal (for example an analog system I/F 21 in FIG. 1) for a monitor connected to the analog video output terminal; a setting operation receiving unit (for example a resolution setting unit 22 in FIG. 1 for displaying an output video resolution setting screen 41 of FIG. 2) for receiving a user setting operation for prioritizing one of the specification information obtained by the specification information obtaining unit and the user selecting operation received by the selecting operation receiving unit; and a determining unit (for example a picture frame converting unit 17 in FIG. 1) for determining a resolution of a video signal to be output on a basis of the specification information obtained by the specification information obtaining unit, the user selecting operation received by the selecting operation receiving unit, and the user setting operation received by the setting operation receiving unit.

A video signal processing device according to an embodiment of the present invention further includes a receiving unit (for example a tuner 11 in FIG. 1) for receiving a television broadcast signal as the video signal to be output.

A video signal processing device according to an embodiment of the present invention further includes a recording and reproducing unit (for example a CODEC 14 to recording media 16 in FIG. 1) for recording the television broadcast signal received by the receiving unit onto a recording medium and reproducing the television broadcast signal.

A video signal processing method according to an embodiment of the present invention includes: a specification information obtaining step (for example step S3 in FIG. 5) of obtaining specification information indicating specifications of a monitor connected to a digital video output terminal; a selecting operation receiving step (for example step S1 in FIG. 5) of receiving a user selecting operation for selecting a type of analog video output terminal for a monitor connected to the analog video output terminal; a setting operation receiving step (for example step S2 in FIG. 5) of receiving a user setting operation for prioritizing one of the specification information obtained by a process of the specification information obtaining step and the user selecting operation received by a process of the selecting operation receiving step; and a determining step (for example step S4 in FIG. 5) of determining a resolution of a video signal to be output on a basis of the specification information obtained by the process of the specification information obtaining step, the user selecting operation received by the process of the selecting operation receiving step, and the user setting operation received by a process of the setting operation receiving step.

Incidentally, correspondences between required elements described in a claim to a program according to an embodiment of the present invention and concrete examples in the embodiments of the invention are the same as in the video signal processing method according to the above-described embodiment of the present invention, and thus description thereof will be omitted.

A concrete embodiment to which the present invention is applied will hereinafter be described in detail with reference to the drawings.

Figure 1:
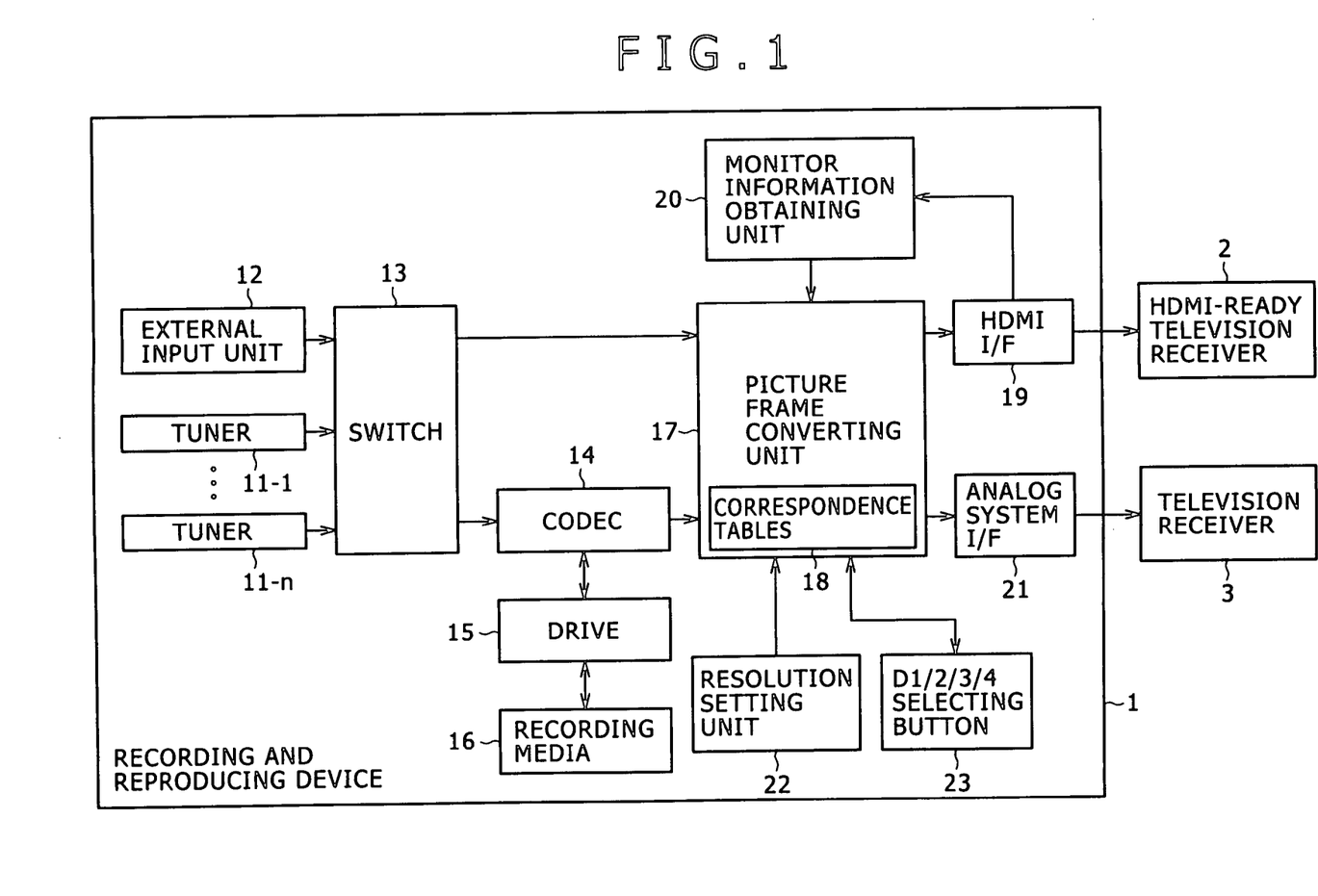
FIG. 1 is a block diagram showing an example of configuration of a recording and reproducing device according to an embodiment of the present invention.

FIG. 1 shows an example of configuration of a recording and reproducing device according to an embodiment of the present invention. The recording and reproducing device 1 records a received television program as well as a video signal and an audio signal input from another electronic device (for example a video camera or the like) onto recording media 16, and reproduces a video signal and an audio signal recorded on the recording media 16 and outputs the video signal and the audio signal to a monitor such as a television receiver or the like.

Tuners 11-1 to 11-n in the recording and reproducing device 1 respectively correspond to a terrestrial analog broadcast signal, a terrestrial digital broadcast signal, a CATV broadcast signal, a BS analog broadcast signal, a BS digital broadcast signal, a digital CS broadcast signal and the like. The tuners 11-1 to 11-n output a video signal, an audio signal, attribute data and the like extracted from the respective broadcast signals to a switch 13. An external input unit 12 outputs a video signal and an audio signal input from another electronic device (for example a video camera or the like) to the switch 13. Attention will hereinafter be directed to only the video signals input from the tuners 11-1 to 11-n and the external input unit 12 to the switch 13.

The switch 13 outputs one of the video signals input from the tuners 11-1 to 11-n and the external input unit 12 to a CODEC 14 according to an operation from a user. The switch 13 can also output an arbitrary video signal to a picture frame converting unit 17 simultaneously with the outputting of the video signal to the CODEC 14.

The CODEC 14 encodes the video signal input from the switch 13 using a predetermined system (for example an MPEG2 system). The CODEC 14 outputs resulting encoded data to a drive 15. In addition, the CODEC 14 decodes encoded data read from the recording media 16 by the drive 15. The CODEC 14 outputs a resulting video signal to the picture frame converting unit 17. The drive 15 records the encoded data input from the CODEC 14 onto the recording media 16. In addition, the drive 15 reads encoded data recorded on the recording media 16, and then outputs the encoded data to the CODEC 14. The recording media 16 are for example formed by an optical disk, a magneto-optical disk, a magnetic disk, a semiconductor memory and the like. The recording media 16 are for example detachable from the drive 15.

The picture frame converting unit 17 determines a resolution by checking specifications (resolution at which display is possible, an aspect ratio and the like) of an HDMI-ready monitor (an HDMI-ready television receiver 2 or the like) connected to an HDMI I/F 19, the specifications being input from a monitor information obtaining unit 20, a setting state of a resolution setting unit 22, and a setting state of a D1/2/3/4 selecting button 23 with correspondence tables 18. The picture frame converting unit 17 converts the video signal input from the switch 13 or the video signal input from the CODEC 14 to the determined resolution. The picture frame converting unit 17 outputs a resulting video signal to the HDMI I/F 19 and the analog system I/F 21.

The HDMI I/F 19 including an HDMI terminal outputs, as a digital signal, the video signal whose resolution is converted by the picture frame converting unit 17 to the HDMI-ready monitor (the HDMI-ready television receiver 2 or the like) connected to the HDMI I/F 19. The analog system I/F 21 including an analog terminal outputs, as an analog signal, the video signal whose resolution is converted by the picture frame converting unit 17 to a non-HDMI-ready monitor (a television receiver 3 or the like) connected to the analog system I/F 21.

The monitor information obtaining unit 20 obtains the specifications of the monitor connected to the HDMI I/F 19, and then outputs the specifications to the picture frame converting unit 17.

The resolution setting unit 22 displays an output video resolution setting screen on the monitor (the HDMI-ready television receiver 2 and (or) the non-HDMI-ready television receiver 3) in response to a predetermined operation from a user to allow the user to make a selection for prioritizing the resolution of the monitor connected to the HDMI I/F 19 or prioritizing a setting of the D1/2/3/4 selecting button 23. Incidentally, it generally suffices to make this setting once when the recording and reproducing device 1 and the monitor are connected to each other.

Figure 2:
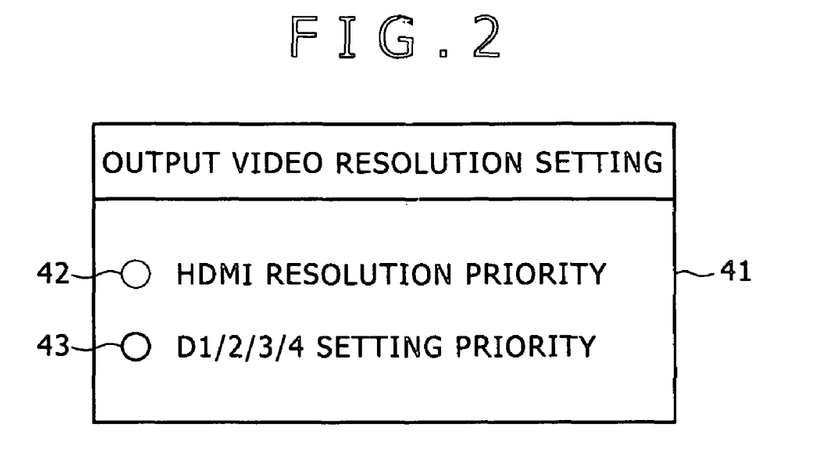
FIG. 2 is a diagram showing an example of display of an output video resolution setting screen.

FIG. 2 shows an example of display of the output video resolution setting screen. The output video resolution setting screen 41 has check boxes 42 and 43. In FIG. 2, the check box 42 is selected. By selecting the check box 42, the user can make a setting to prioritize the resolution of the monitor connected to the HDMI I/F 19 (this will hereinafter be described as HDMI resolution priority). By selecting the check box 43, the user can make a setting to prioritize the resolution of the monitor connected to the analog system I/F 21 (this will hereinafter be described as D1/2/3/4 setting priority).

The resolution setting unit 22 also displays an HDMI resolution setting screen on the monitor (the HDMI-ready television receiver 2 and (or) the non-HDMI-ready television receiver 3) in response to a predetermined operation from the user to allow the user to make a selection for setting the resolution of a video signal output from the HDMI I/F 19 to a maximum resolution at which the monitor connected to the HDMI I/F 19 can make display, or to an arbitrary resolution (525 i (480 i), 525 p (480 p), 1125 i (1080 i), or 750 p (720 p)).

Figure 3:
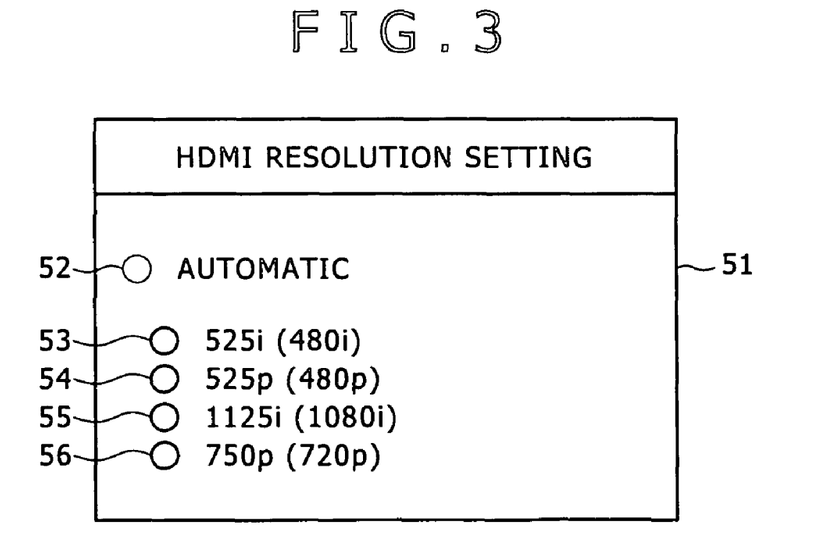
FIG. 3 is a diagram showing an example of display of an HDMI resolution setting screen.
Figure 4A:
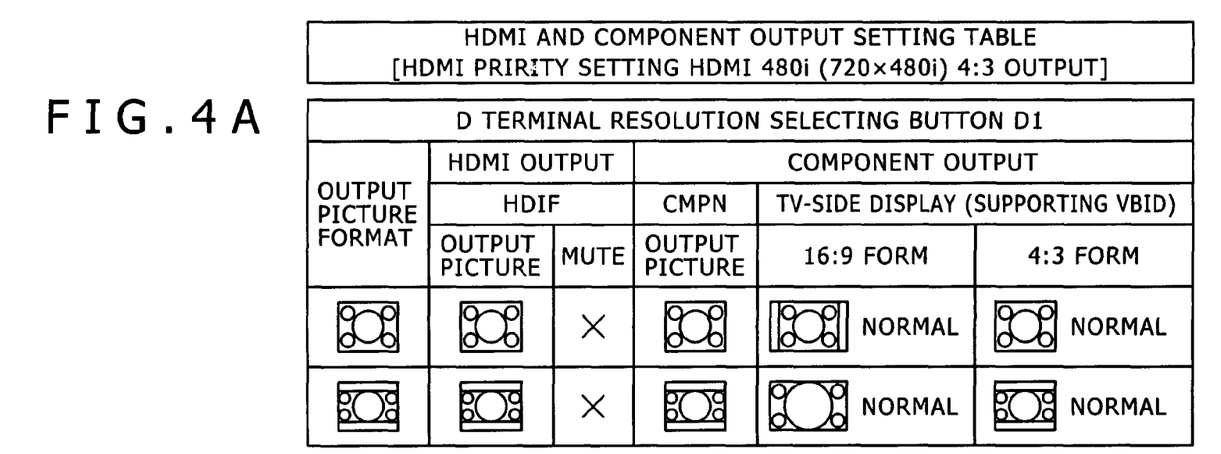
FIGS. 4A to 4D are diagrams showing a part of correspondence tables included in a picture frame converting unit in FIG. 1.
Figure 4B:
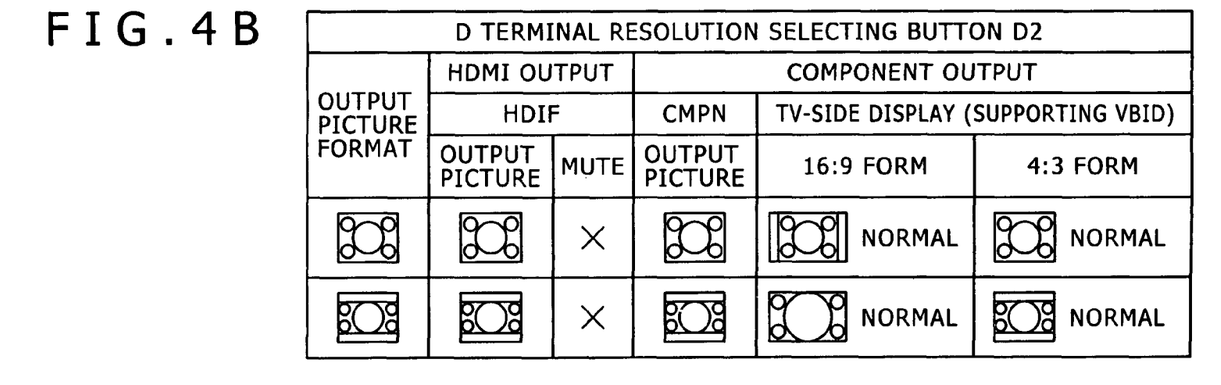
Figure 4C:
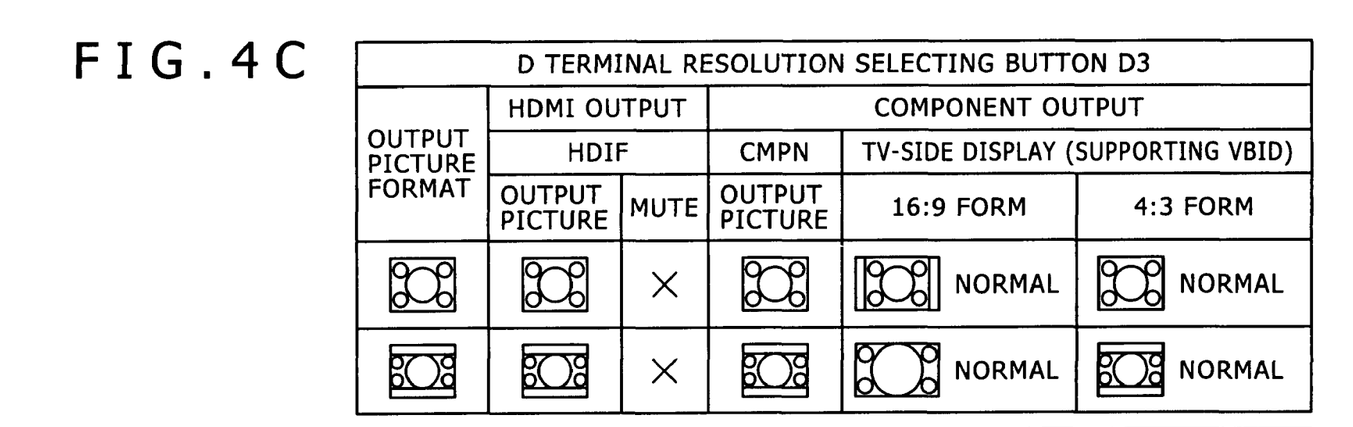
Figure 4D:
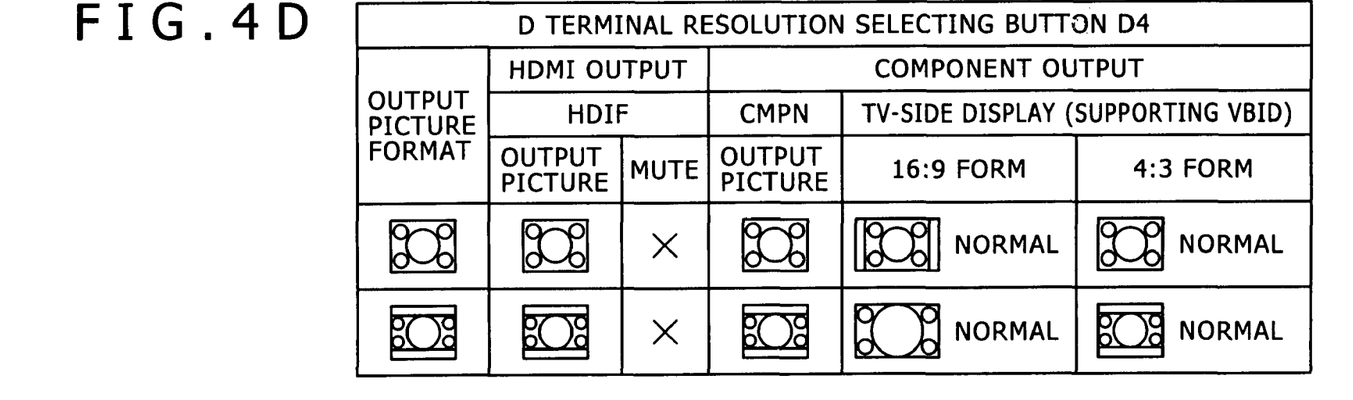

FIG. 3 shows an example of display of the HDMI resolution setting screen. The HDMI resolution setting screen 51 has check boxes 52 to 56. In practice, however, of the check boxes 52 to 56, only check boxes corresponding to resolutions at which the monitor connected to the HDMI I/F 19 can make display are displayed. In FIG. 3, the check box 52 is selected. By selecting the check box 52, the user can set the resolution of a video signal output from the HDMI I/F 19 to a maximum resolution at which the monitor connected to the HDMI I/F 19 can make display (this will hereinafter be described as automatic setting). By selecting the check boxes 53 to 56, the user can arbitrarily set the resolution of a video signal output from the HDMI I/F 19.

Incidentally, when a setting is made to the HDMI resolution priority on the output video resolution setting screen 41, the check box 52 is selected to make a setting to the automatic setting on the HDMI resolution setting screen 51.

Returning to FIG. 1, the D1/2/3/4 selecting button 23 is provided in an external wall surface or the like of a casing of the recording and reproducing device 1. The D1/2/3/4 selecting button 23 allows the user to select one of D1 to D4 according to the specifications of the monitor (the television receiver 3 or the like) connected to a D terminal included in the analog system I/F 21.

FIG. 4 shows a part of correspondence tables 18 included in the picture frame converting unit 17. The example illustrated in FIG. 4 shows the resolution of a video signal output from the HDMI I/F 19 and the resolution of a video signal output from a component video terminal or a D video terminal of the analog system I/F 21 when the D1/2/3/4 selecting button.23 is switched to D1 to D4 in a case where a setting is made to the HDMI resolution priority on the output video resolution setting screen 41, the resolution of the monitor connected to the HDMI I/F 19 is 480 i (720×480 i), and the aspect ratio of the monitor is 4:3. In this case, a 720×480 i (4:3) video signal is output from both the HDMI I/F 19 and the analog system I/F 21 irrespective of the setting state of the D1/2/3/4 selecting button 23.

In addition to the example shown in FIG. 4, correspondence tables 18 corresponding to the following 11 cases are prepared.

In a case where a setting is made to the HDMI resolution priority on the output video resolution setting screen 41, the resolution of the monitor connected to the HDMI I/F 19 is 480 i (720×480 i), and the aspect ratio of the monitor is 16:9, a 720×480 i (16:9) video signal is output from both the HDMI I/F 19 and the analog system I/F 21 irrespective of the setting state of the D1/2/3/4 selecting button 23.

In a case where a setting is made to the HDMI resolution priority on the output video resolution setting screen 41, the resolution of the monitor connected to the HDMI I/F 19 is 480 p (720×480 p), and the aspect ratio of the monitor is 4:3, when the setting state of the D1/2/3/4 selecting button 23 is D1, a 720×480 p (4:3) video signal is output from the HDMI I/F 19, while output from the analog system I/F 21 is stopped. When the setting state of the D1/2/3/4 selecting button 23 is D2 to D4, a 720×480 p (4:3) video signal is output from both the HDMI I/F 19 and the analog system I/F 21.

In a case where a setting is made to the HDMI resolution priority on the output video resolution setting screen 41, the resolution of the monitor connected to the HDMI I/F 19 is 480 p (720×480 p), and the aspect ratio of the monitor is 16:9, when the setting state of the D1/2/3/4 selecting button 23 is D1, a 720×480 p (16:9) video signal is output from the HDMI I/F 19, while output from the analog system I/F 21 is stopped. When the setting state of the D1/2/3/4 selecting button 23 is D2 to D4, a 720×480 p (16:9) video signal is output from both the HDMI I/F 19 and the analog system I/F 21.

In a case where a setting is made to the HDMI resolution priority on the output video resolution setting screen 41, the resolution of the monitor connected to the HDMI I/F 19 is 1080 i (1920×1080 i), and the aspect ratio of the monitor is 16:9, when the setting state of the D1/2/3/4 selecting button 23 is D1 or D2, a 1920×1080 i (16:9) video signal is output from the HDMI I/F 19, while output from the analog system I/F 21 is stopped. When the setting state of the D1/2/3/4 selecting button 23 is D3 or D4, a 1920×1080 i (16:9) video signal is output from both the HDMI I/F 19 and the analog system I/F 21.

In a case where a setting is made to the HDMI resolution priority on the output video resolution setting screen 41, the resolution of the monitor connected to the HDMI I/F 19 is 720 p (1280×720 p), and the aspect ratio of the monitor is 16:9, when the setting state of the D1/2/3/4 selecting button 23 is D1 to D3, a 1280×720 p (16:9) video signal is output from the HDMI I/F 19, while output from the analog system I/F 21 is stopped. When the setting state of the D1/2/3/4 selecting button 23 is D4, a 1280×720 p (16:9) video signal is output from both the HDMI I/F 19 and the analog system I/F 21.

In a case where a setting is made to the D1/2/3/4 setting priority on the output video resolution setting screen 41, the resolution of the monitor connected to the HDMI I/F 19 is 480 i (720×480 i), and the aspect ratio of the monitor is 4:3, when the setting state of the D1/2/3/4 selecting button 23 is D1, a 720×480 i video signal is output from both the HDMI I/F 19 and the analog system I/F 21. When the setting state of the D1/2/3/4 selecting button 23 is D2, output from the HDMI I/F 19 is stopped, while a 720×480 p video signal is output from the analog system I/F 21. When the setting state of the D1/2/3/4 selecting button 23 is D3, output from the HDMI I/F 19 is stopped, while a 1920×1080 i video signal is output from the analog system I/F 21. When the setting state of the D1/2/3/4 selecting button 23 is D4, output from the HDMI I/F 19 is stopped, while a 1280×720 p video signal is output from the analog system I/F 21.

In a case where a setting is made to the D1/2/3/4 setting priority on the output video resolution setting screen 41, the resolution of the monitor connected to the HDMI I/F 19 is 480 i (720×480 i), and the aspect ratio of the monitor is 16:9, when the setting state of the D1/2/3/4 selecting button 23 is D1, a 720×480 i video signal is output from both the HDMI I/F 19 and the analog system I/F 21. When the setting state of the D1/2/3/4 selecting button 23 is D2, output from the HDMI I/F 19 is stopped, while a 720×480 p video signal is output from the analog system I/F 21. When the setting state of the D1/2/3/4 selecting button 23 is D3, output from the HDMI I/F 19 is stopped, while a 1920×1080 i video signal is output from the analog system I/F 21. When the setting state of the D1/2/3/4 selecting button 23 is D4, output from the HDMI I/F 19 is stopped, while a 1280×720 p video signal is output from the analog system I/F 21.

In a case where a setting is made to the D1/2/3/4 setting priority on the output video resolution setting screen 41, the resolution of the monitor connected to the HDMI I/F 19 is 480 p (720×480 p), and the aspect ratio of the monitor is 4:3, when the setting state of the D1/2/3/4 selecting button 23 is D1, output from the HDMI I/F 19 is stopped, while a 720×480 i video signal is output from the analog system I/F 21. When the setting state of the D1/2/3/4 selecting button 23 is D2, a 720×480 p video signal is output from both the HDMI I/F 19 and the analog system I/F 21. When the setting state of the D1/2/3/4 selecting button 23 is D3, output from the HDMI I/F 19 is stopped, while a 1920×1080 i video signal is output from the analog system I/F 21. When the setting state of the D1/2/3/4 selecting button 23 is D4, output from the HDMI I/F 19 is stopped, while a 1280×720 p video signal is output from the analog system I/F 21.

In a case where a setting is made to the D1/2/3/4 setting priority on the output video resolution setting screen 41, the resolution of the monitor connected to the HDMI I/F 19 is 480 p (720×480 p), and the aspect ratio of the monitor is 16:9, when the setting state of the D1/2/3/4 selecting button 23 is D1, output from the HDMI I/F 19 is stopped, while a 720×480 i video signal is output from the analog system I/F 21. When the setting state of the D1/2/3/4 selecting button 23 is D2, a 720×480 p video signal is output from both the HDMI I/F 19 and the analog system I/F 21. When the setting state of the D1/2/3/4 selecting button 23 is D3, output from the HDMI I/F 19 is stopped, while a 1920×1080 i video signal is output from the analog system I/F 21. When the setting state of the D1/2/3/4 selecting button 23 is D4, output from the HDMI I/F 19 is stopped, while a 1280×720 p video signal is output from the analog system I/F 21.

In a case where a setting is made to the D1/2/3/4 setting priority on the output video resolution setting screen 41, the resolution of the monitor connected to the HDMI I/F 19 is 1080 i (1920×1080 i), and the aspect ratio of the monitor is 16:9, when the setting state of the D1/2/3/4 selecting button 23 is D1, output from the HDMI I/F 19 is stopped, while a 720×480 i video signal is output from the analog system I/F 21. When the setting state of the D1/2/3/4 selecting button 23 is D2, output from the HDMI I/F 19 is stopped, while a 720×480 p video signal is output from the analog system I/F 21. When the setting state of the D1/2/3/4 selecting button 23 is D3, a 1920×1080 i video signal is output from both the HDMI I/F 19 and the analog system I/F 21. When the setting state of the D1/2/3/4 selecting button 23 is D4, output from the HDMI I/F 19 is stopped, while a 1280×720 p video signal is output from the analog system I/F 21.

In a case where a setting is made to the D1/2/3/4 setting priority on the output video resolution setting screen 41, the resolution of the monitor connected to the HDMI I/F 19 is 720 p (1280×720 p), and the aspect ratio of the monitor is 16:9, when the setting state of the D1/2/3/4 selecting button 23 is D1, output from the HDMI I/F 19 is stopped, while a 720×480 i video signal is output from the analog system I/F 21. When the setting state of the D1/2/3/4 selecting button 23 is D2, output from the HDMI I/F 19 is stopped, while a 720×480 p video signal is output from the analog system I/F 21. When the setting state of the D1/2/3/4 selecting button 23 is D3, output from the HDMI I/F 19 is stopped, while a 1920×1080 i video signal is output from the analog system I/F 21. When the setting state of the D1/2/3/4 selecting button 23 is D4, a 1280×720 p video signal is output from both the HDMI I/F 19 and the analog system I/F 21.

Figure 5:
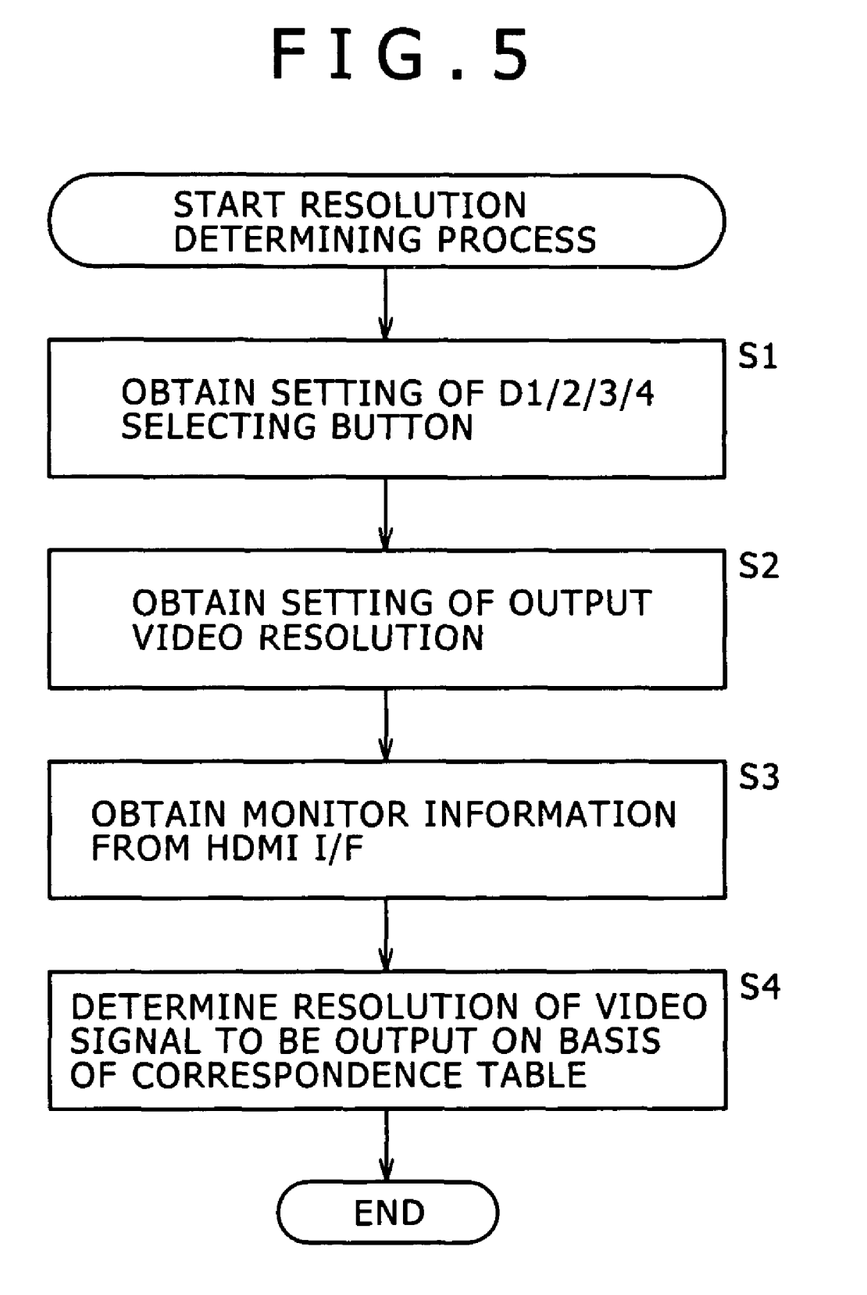
FIG. 5 is a flowchart of assistance in explaining a resolution determining process by the picture frame converting unit in FIG. 1.

A resolution determining process by the picture frame converting unit 17 will next be described with reference to a flowchart of FIG. 5.

In step S1, the D1/2/3/4 selecting button 23 obtains a setting state (one of D1 to D4), and then outputs the setting state to the picture frame converting unit 17. In step S2, the resolution setting unit 22 obtains a user setting (the HDMI resolution priority or the D1/2/3/4 setting priority) on the output video resolution setting screen 41. In step S3, the monitor information obtaining unit 20 obtains the specifications of the monitor connected to the HDMI I/F 19, and then outputs the specifications to the picture frame converting unit 17.

In step S4, the picture frame converting unit 17 determines which of the 12 correspondence tables 18 described above to apply on the basis of the user setting indicating the HDMI resolution priority or the D1/2/3/4 setting priority and the specifications (resolution and aspect ratio) of the monitor connected to the HDMI I/F 19, the user setting and the specifications being obtained in the processes of steps S2 and S3. Then, the A/D converting unit 71 determines the resolution of a video signal by checking the setting state indicating one of D1 to D4 of the D1/2/3/4 selecting button 23, the setting state being obtained by the process of step S1, with the determined correspondence table.

For example, in a case where a setting is made to the HDMI resolution priority, the resolution of the monitor connected to the HDMI I/F 19 is 480 i (720×480 i), and the aspect ratio of the monitor is 4:3, it is determined that the correspondence table shown in FIG. 4 is to be applied. Then, the resolution is determined according to which of D1 to D4 the D1/2/3/4 selecting button 23 is set to. This concludes the description of the resolution determining process by the picture frame converting unit 17.

As described above, the recording and reproducing device 1 to which the present invention is applied outputs video signals having common specifications from the HDMI I/F 19 and the analog system I/F 21. It is therefore possible to reduce a load of a process of converting resolution or the like.

The series of processes described above can be carried out not only by hardware but also by software. When the series of processes is to be carried out by software, a program constituting the software is installed from a recording medium onto a computer incorporated in special hardware, or a general-purpose personal computer, for example, that can perform various functions by installing various programs thereon.

It is to be noted that in the present specification, the steps performed on the basis of the program include not only processes carried out in time series in the described order but also processes carried out in parallel or individually and not necessarily in time series.

It should be understood by those skilled in the art that various modifications, combinations, sub-combinations and alterations may occur depending on design requirements and other factors insofar as they are within the scope of the appended claims or the equivalents thereof.

What is claimed is:

1. A video signal processing device having a digital video output terminal and an analog video output terminal, comprising:
    a specification information obtaining unit configured to obtain specification information of a digital monitor connected to said digital video output terminal;
    an analog specification selecting unit configured to select, based on a user selection operation, a specification information of an analog monitor connected to said analog video output terminal;
    a specification setting unit configured to set, based on a user setting operation, a priority between said specification information of the digital monitor and said specification information of the analog monitor;
    a determining unit configured to determine an output resolution of a video signal to be output via at least one of the digital video output terminal and the analog video output terminal; and
    an output control unit configured to control output of the video signal, at the output resolution, via at least one of the digital video output terminal and the analog video output terminal, wherein
    when priority is set to the specification information of the digital monitor, the determination unit determines the output resolution of the video signal as a highest resolution included in the specification information of the digital monitor, and the output control unit, while outputting the video signal at the output resolution via the digital video output terminal, outputs the video signal at the output resolution via the analog video output terminal only when the specification information of the analog monitor includes the output resolution, and
    when priority is set to the specification information of the analog monitor, the determination unit determines the output resolution of the video signal as a highest resolution included in the specification information of the analog monitor, and the output control unit, while outputting the video signal at the output resolution via the analog video output terminal, outputs the video signal at the output resolution via the digital video output terminal only when the specification information of the digital monitor includes the output resolution.

2. The video signal processing device as claimed in claim 1,
    wherein said determining unit determines the output resolution of the video signal by applying one of a plurality of a plurality of predetermined correspondence tables, the applied one of the plurality of correspondence tables corresponding to said specification information of the digital monitor, said user selection operation, and said user setting operation.

3. The video signal processing device as claimed in claim 1, further comprising:
   a receiving unit configured to receive a television broadcast signal as said video signal to be output.

4. The video signal processing device as claimed in claim 3, further comprising:
   a recording and reproducing unit configured to record said received television broadcast signal onto a recording medium and to reproduce said television broadcast signal.

5. A video signal processing method of a video signal processing device having a digital video output terminal and an analog video output terminal, said method comprising:
   obtaining specification information of a digital monitor connected to said digital video output terminal;
   selecting, based on a user selecting operation, a specification information of an analog monitor connected to said analog video output terminal;
   setting, based on a user setting operation, a priority between said specification information of the digital monitor and said specification information of the analog monitor;
   determining an output resolution of a video signal to be output to at least one of the digital video output terminal and the analog video output terminal; and
   controlling output of the video signal, at the output resolution, via at least one of the digital video output terminal and the analog video output terminal, wherein
   when priority is set to the specification information of the digital monitor, the output resolution of the video signal is set to a highest resolution included in the specification information of the digital monitor, and while the video signal is outputted via the digital video output terminal using the output resolution, the video signal is outputted via the analog video output terminal only when the specification information of the analog monitor includes the output resolution, and
   when priority is set to the specification information of the analog monitor, the output resolution of the video signal is set to a highest resolution included in the specification information of the analog monitor, and while the video signal is outputted via the analog video output terminal using the output resolution, the video signal is outputted via the digital video output terminal only when the specification information of the digital monitor includes the output resolution.

6. A non-transitory computer-readable medium storing computer-readable instructions thereon for controlling a video signal processing device having a digital video output terminal and an analog video output terminal, said computer-readable instructions when executed by a computer cause the computer to perform a process comprising:
   obtaining specification information of a digital monitor connected to said digital video output terminal;
   selecting, based on a user selecting operation, a specification information of an analog monitor connected to said analog video output terminal;
   setting, based on a user setting operation, a priority between said specification information of the digital monitor and said specification information of the analog monitor;
   determining an output resolution of a video signal to be output to at least one of the digital video output terminal and the analog video output terminal; and
   controlling output of the video signal, at the output resolution, via at least one of the digital video output terminal and the analog video output terminal, wherein
   when priority is set to the specification information of the digital monitor, the output resolution of the video signal is set to a highest resolution included in the specification information of the digital monitor, and while the video signal is outputted via the digital video output terminal using the output resolution, the video signal is outputted via the analog video output terminal only when the specification information of the analog monitor includes the output resolution, and
   when priority is set to the specification information of the analog monitor, the output resolution of the video signal is set to a highest resolution included in the specification information of the analog monitor, and while the video signal is outputted via the analog video output terminal using the output resolution, the video signal is outputted via the digital video output terminal only when the specification information of the digital monitor includes the output resolution.

* * * * *